June 5, 1934.  C. W. CLARK  1,961,844
SWITCH FOR A SIGNALING DEVICE
Filed June 25, 1932
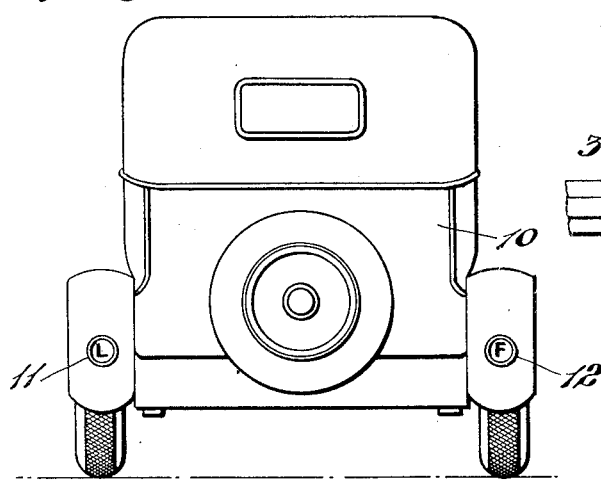
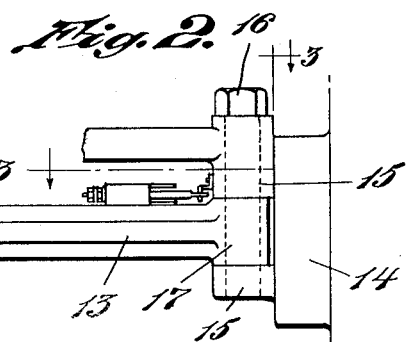
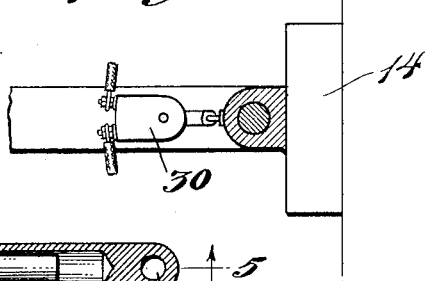
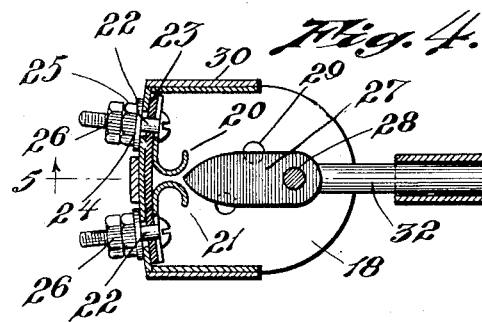
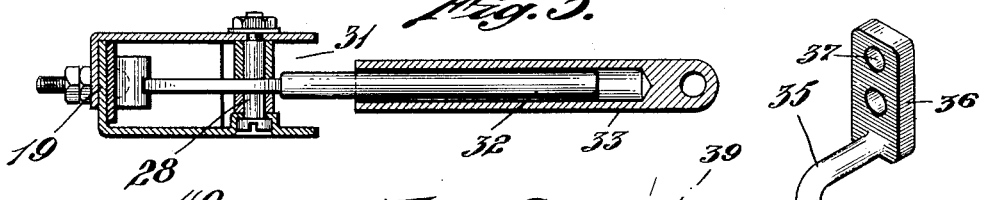
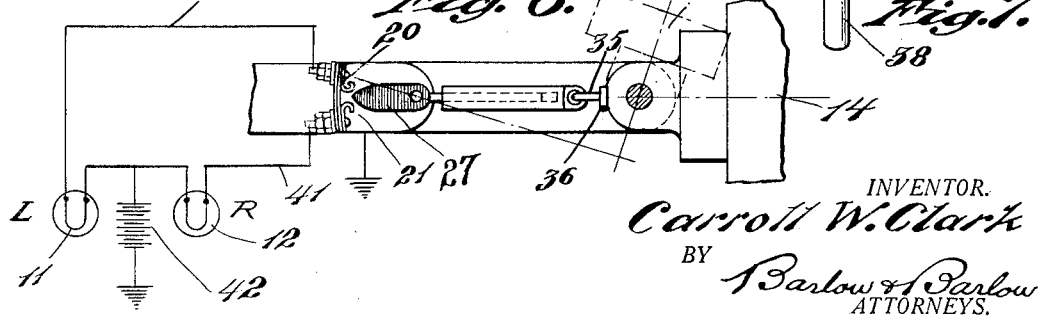
INVENTOR.
Carroll W. Clark
BY
Barlow & Barlow
ATTORNEYS.

Patented June 5, 1934

1,961,844

UNITED STATES PATENT OFFICE 1,961,844

SWITCH FOR A SIGNALING DEVICE

Carroll W. Clark, Providence, R. I.

Application June 25, 1932, Serial No. 619,184

4 Claims. (Cl. 200—59)

This invention relates to the control of a signaling device on a vehicle, and has for one of its objects to provide a construction which will automatically indicate a desired direction signal without requiring any of the attention of the driver of the motor vehicle.

Another object of this invention is the provision of a signal and actuating mechanism which will operate upon movement of the front wheels of the vehicle to direct the vehicle to either the right or left but will be inoperative when the wheels of the vehicle are straight or turned to a sufficient extent to be beyond the driving range of operation, such as when parking, whereby the energy of a battery or other energizing source may be conserved.

Another object of this invention is the provision of a unit construction which may be mounted adjacent one wheel of the vehicle and be contained within a compact space which will not interfere with the normal operation of the vehicle.

Another object of the invention is the provision of a construction which will expand and contract to accommodate itself to the varying distances occasioned by the relative movement of the parts between which it is mounted and connected.

Another object of the invention is to provide an arrangement of the operating parts so that the signal will operate only upon swinging movement of the ground wheels and will not operate by reason of looseness in the steering linkage connections.

A further object of the invention is the provision of a construction which will not become clogged by accumulation of dirt or foreign matter about the steering mechanism of the vehicle and one which is extremely inexpensive to construct and operate.

With these and other objects in view, the invention consists of certain novel features of construction, as will be more fully described, and particularly pointed out in the appended claims.

In the accompanying drawing:—

Fig. 1 is an end view of a back of a motor vehicle with left and right signaling lights mounted upon either mudguard.

Fig. 2 is a fragmental view showing the front axle and portion swingable with the wheel mounted thereon, also showing my device in its working relation to these parts.

Fig. 3 is a top plan view of the structure shown in Fig. 2 partially in section as on line 3—3 thereof.

Fig. 4 is a central sectional view showing the assembled switch mechanism of my improved construction.

Fig. 5 is a section on line 5—5 of Fig. 4.

Fig. 6 is a diagrammatic view showing the wiring diagram of the device and also in dash lines the position of the switch in the disconnected working position.

Fig. 7 is a perspective view of the finger and its mounting for connection to the swinging part of the automotive steering mechanism.

It is frequently desirable in the operation of the motor vehicle to signal to a following operator a change of direction, and in order that the slightest movement of the front wheels will cause such signal, I have provided two electric circuits connecting right and left signal devices and also a double throw switch having a contact in each circuit and a common movable contact in both circuits which is so arranged that upon the slightest movement of the front wheels to one side or the other, one of the fixed contacts will be engaged and the signal lamp in its circuit energized and put in operation; and the following is a detailed description of the present embodiment of this invention illustrating the preferred means by which these advantageous results may be accomplished.

With reference to the drawing, 10 designates generally a motor vehicle which has mounted upon the left rear mudguard a signal 11, and mounted upon the right rear mudguard another signal 12. Upon the usual front axle 13, there is swivelly mounted the knuckle portion 14 movable with the guiding wheel having bearings 15 to receive the bolt or king pin 16 which extends through the bearing 17 of the axle, thus the guiding wheel will swing with reference to the axle 13, which movement may be caused by the usual drag link and tie rod connections well-known in the automotive industry.

My switch consists of a body plate 18 with an upwardly extending flange 19 upon which there are adjustably mounted contacts 20 and 21 by means of bolts 22 extending through slots therein, and these contacts and bolts are suitably insulated from the flange 19 by fiber or like material 23 and a washer 24 beneath the binding nut 25. The set nut 26 serves to secure the desired lead wire in electrical connection with the contact 20 or 21. A movable contact 27 is pivotally mounted as at 28 on the body plate 18 and is of such length as to engage either the contact 20 or 21 upon swinging movement to the right or left about the pivot 28. When in central position, corresponding to the position of the wheels for straight driving, this movable contact or arm is located between the contacts 20 and 21 and out of engagement with both of them.

The body plate 18 is suitably secured on the axle 13 by means of bolts extending through openings 29 or by any other suitable manner. A cover 30 fits over and houses the parts just above described to keep the dust and dirt or other foreign matter from interfering with the operation of the switch. This cover is open along one side 31 opposite the contacts 20 and 21 and a movable contact 27 swings through this open side and is provided with an arm 32 extending outwardly therefrom which has a telescoping member 33 slidable therealong and provided with an opening 34 at its end.

A finger 35 having a base 36 with openings 37 is rigidly secured to a part movable with the guiding front wheels here shown as on the upper bearing 15 and this finger is turned downwardly as at 38 to extend through the opening 34 in the telescoping member 33 so that upon turning of the guiding front wheels the arm and movable contact 27 will be swung about its pivot 28 into engagement with one or the other of the contacts 20 or 21 depending upon the direction of the swinging movement of the ground wheels.

In the wiring diagram shown in Fig. 6, assuming that the portion 14 swings with the left front wheel of the vehicle and the wheel were turned to direct the vehicle to the left toward the dot-dash line position illustrated at 39, then during this movement the contact 20 would be engaged and the signal 11 would be energized through lead 40 connected to the contact 20. As the part 14 is swung in the opposite direction the contact 21 would be engaged and the signal 12 energized through lead 41. The return or completion of the circuit is made through a ground to which the base or body upon which the movable contact is mounted is connected. The showing herein is largely conventional and indicates the completion of the circuit through a battery 42 as a source of energy.

When the wheel is swung to the extreme dotted line position shown in Fig. 6, the arm will be swung to a position beyond contact 20 so that if, in parking, it is desired to move the wheels to an extreme position, such as when on a hill or the like, the contact will be disengaged and the signal lamp will not be energized as this is a non-operating position of the steering mechanism of the motor vehicle.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. In combination with a vehicle having an axle, wheel knuckles pivoted at the end thereof, a finger provided on one of said knuckles, a switch of a width substantially that of said axle mounted on said axle, and an operator extended along said axle connected to said finger for operating said switch.

2. In combination with a vehicle having an axle, wheel knuckles pivoted at the ends thereof, a finger provided on one of said knuckles, a switch substantially the width of the axle mounted on said axle having a pair of contacts, and an arm extending along said axle with a telescoping part at its outer end slotted and receiving said finger, said arm being positioned between said contacts when the knuckles are in position for straight line movement of the vehicle and swingable to engage one of said contacts when turned therefrom.

3. In combination with a vehicle having an axle, wheel knuckles pivoted at the ends thereof, a switch mounted on the vehicle having a pair of rounded nose resilient contacts, and an arm connected to a part movable with said knuckles, said arm being positioned between said contacts when the knuckles are in position for straight line movement of the vehicle and swingable to engage, flex and pass beyond one of said contacts when turned beyond normal driving position, said rounded nose permitting back and forth movements with the minimum amount of flexing.

4. In combination with a vehicle having an axle, wheel knuckles pivoted at the ends thereof, a finger provided on one of said knuckles, a switch having a pair of rounded nose resilient contacts, and an arm with a telescoping part at its outer end connected to said finger, said arm being positioned between said contacts when the knuckles are in position for straight line movement of the vehicle and swingable to engage, flex and pass beyond one of said contacts when turned beyond normal driving position, said rounded nose permitting back and forth movement with the minimum amount of flexing.

CARROLL W. CLARK.